April 7, 1942.  G. T. JACOCKS  2,278,882
PRESSURE VESSEL
Original Filed Feb. 17, 1939

INVENTOR
George T. Jacocks
BY
ATTORNEY

Patented Apr. 7, 1942

2,278,882

UNITED STATES PATENT OFFICE 2,278,882

PRESSURE VESSEL

George T. Jacocks, New Rochelle, N. Y., assignor to The Lummus Company, New York, N. Y., a corporation of Delaware Original application February 17, 1939, Serial No. 256,934. Divided and this application December 4, 1941, Serial No. 421,576

2 Claims. (Cl. 220—46)

This invention relates to improvements in pressure vessels and more particularly to sealed openings therefor. It is a division of my co-pending application, Serial No. 256,934, filed February 17, 1939 and entitled "Pressure vessel."

It is one of the principal objects of this invention to provide a pressure vessel with a sealed opening such as a manhole in which the opening can be sealed in a pressure-tight manner and in which the sealing element can be easily removed.

Another object of the invention is to provide an improved type of joint between the cover and the manhole nozzle of a high pressure vessel in which the cover can be sealed with a pressure in excess of and independent of the securing pressure.

A still further object of the invention is to provide a less expensive and yet stronger opening and cover for a pressure vessel in which the cover is sealed by a cantilever type gasket, such gasket having one end fixed and the other end movable so that it creates a radial seal under axial compression by the cover, the movement of the cover being arranged to increase the sealing force due to the pressure on the cover.

Figure 1:
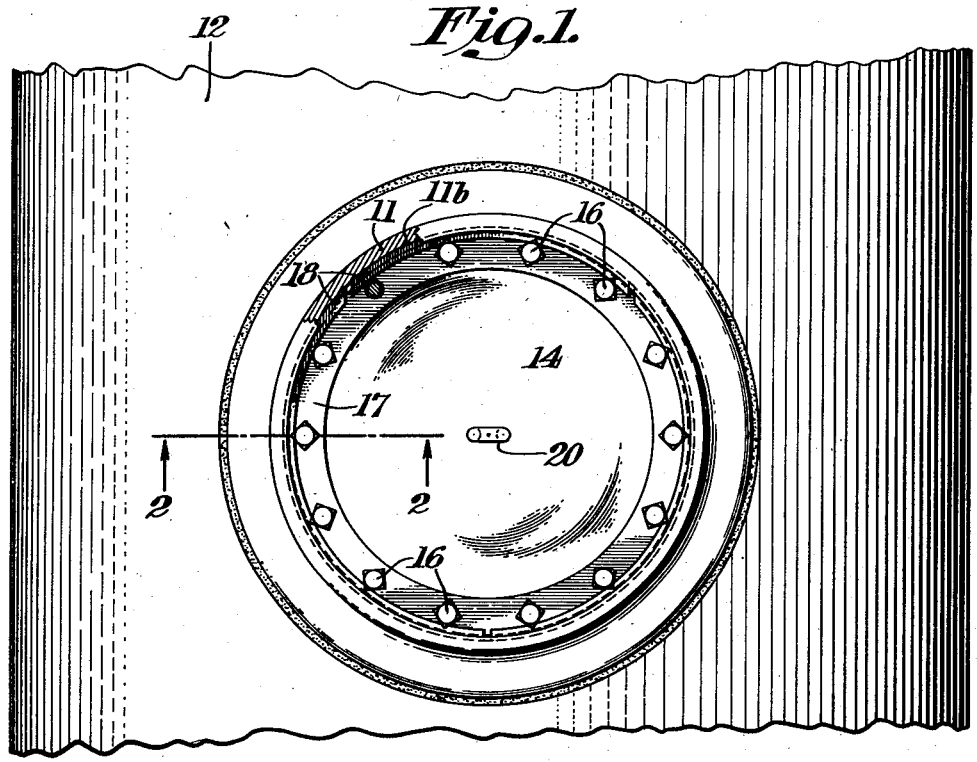
Figure 2:
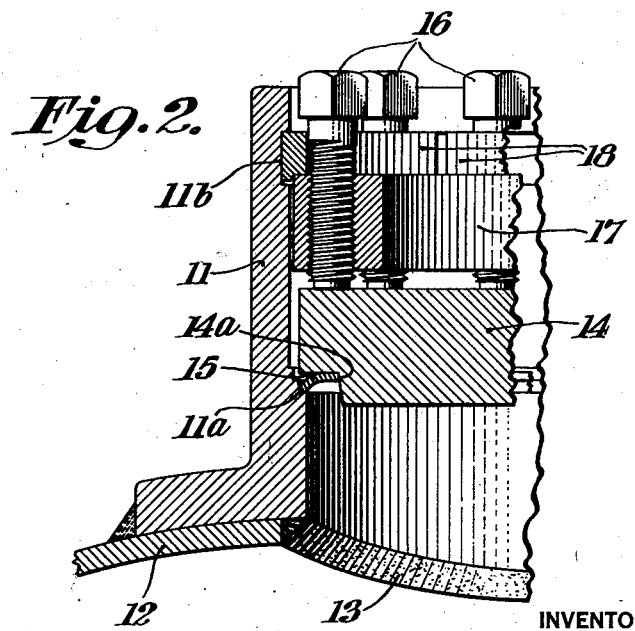

Further objects and advantages of the invention will appear from the following description of a preferred form of embodiment thereof taken in connection with the attached drawing, in which Fig. 1 is a side elevation of a pressure vessel having a manhole or similar sealed opening;

Fig. 2 is a cross section on the line 1—1 of Fig. 1, showing the internal construction.

In accordance with the preferred form of embodiment of my invention, the pressure vessel is conveniently provided with a manhole nozzle 11, adapted to be integrally secured to the vessel 12 normally operating under vacuum or conditions of low absolute pressure. Such vessel has an opening 13, which is closed by the cover 14. The gasket 15 maintains a seal between the cover 14 and the nozzle 11, such gasket being of a curved or arcuate cross section with a relatively flat edge locked in position by engagement of the inner edge in a recess 14a in the cover 14. The outer edge of the gasket is materially curved and engages the shoulder 11a in the nozzle. The movement of the cover 14 against the gasket 15 will cause a radial movement of infinite pressure of the outer edge of the gasket to accomplish the desired seal. This may be initiated by a plurality of securing devices 16 carried in a suitable bull ring 17, which is locked within the nozzle 11 by the split ring 18. The split ring 18 may be assembled in the recess 11b in the nozzle wall and is in shear relation therewith. The securing devices 16 engage the top wall of the cover 14 and force the cover against the gasket 15. The shoulder 11a in the nozzle 11 is curved to facilitate the rolling movement of the gasket on the nozzle, the other edge being anchored as a cantilever on the cover.

If the pressure is relieved, the edges of the gasket will break away so that the entire cover can be quickly disassembled. The sealing movement is almost entirely on the nozzle side of the gasket although a sealing reaction will eventually be made against the cover.

This form is preferable for vacuum vessels, inasmuch as the greater external pressure will tend to increase the effectiveness of the seal. It is, of course, obvious that it can be equally as well used on all pressure vessels. The words "pressure vessel" are intended to cover all types of vessels whether of vacuum or superatmospheric type.

It is preferable to make the principal diameter of the cover 14 slightly greater than the smallest diameter of the nozzle wall or vessel opening in order that the cover not drop through if the gasket is inadvertently removed. It is, of course, to be understood that the gasket acts as the stop when in place. It is also desirable to make the axial wall of the recess 14a slightly tapered in order that the gasket will fit it snugly and will be freely removable therefrom when the parts are released. A lifting ring 20 can be used to manipulate the cover.

It will be apparent that this type of joint structure and gasket is also adaptable for sealing any tubular shell with a cover whether it be a manhole or whether it be the end of the vessel itself. It is of particular economic advantage as expensive flanges are eliminated, and all of the securing devices are within the periphery of the nozzle, which may be only slightly larger than the actual opening in the vessel. The cover is of even smaller diameter than the nozzle as it is carried within the inner diameter thereof, to which it is sealed by the gasket. The economy in structure will thus be apparent.

While I have shown a preferred form of embodiment of my invention, I am aware that other modifications can be made thereto, and I, therefore, desire a broad interpretation of my invention within the scope and spirit of the disclosure herein and of the claims appended hereinafter.

I claim:

1. A pressure vessel having an opening in the wall thereof, a nozzle projecting from the vessel wall adjacent said opening, said nozzle having an internal shoulder thereon projecting into the opening, a cover of smaller external diameter than the internal diameter of said nozzle, said cover having a peripheral shoulder adjacent one edge, an annular gasket extending between the shoulder on said nozzle and the shoulder on said cover, said gasket being relatively flat from its inner edge to an intermediate part of its cross section and substantially curved through the remainder of its cross section, the flat edge of said gasket being relatively fixed and the curved edge of said gasket being relatively movable, one face of the peripheral shoulder on the cover engaging the relatively flat edge of the gasket and anchoring the gasket as a cantilever, the free edge of the gasket having a rolling contact on the shoulder on the nozzle wall, the internal wall of said nozzle having a recess and a split ring extending into said recess in shear relation with the internal wall of the opening, and a continuous ring interposed between the split ring and the cover and adapted to engage the split ring, adjustable members carried by said continuous ring and reacting through said nozzle and engaging said cover, said adjustable members on adjustment forcing the cover against the gasket and moving the free curved end thereof into a relatively straight position to establish sealing relation, said cover being freely movable inwardly whereby a superior external pressure will tend to assist the straightening force on the gasket.

2. A pressure vessel having a circular opening, the wall of said vessel adjacent the opening having a peripheral shoulder extending into the opening and having its recessed corner rounded, a cover for said opening having a principal diameter greater than the smaller diameter of the peripheral shoulder, said cover having a peripheral recess on the inner side, said recess having a tapered axial wall and a flat radial wall, and an annular gasket to seal the cover to the peripheral shoulder in the vessel wall, said gasket being relatively flat from its median portion to its inner edge and being of an inner diameter to snugly fit the recess in the cover, the gasket being relatively curved from its median portion to the outer edge, the outer edge being rounded and adapted to roll in the rounded portion of the peripheral shoulder of the wall, and means to force said cover against said gasket to flatten the outer part into sealing relation and to hold said cover, said means including a bull ring, a series of studs adjustably carried by said bull ring and engaging said cover, said vessel wall having a peripheral recess, and a split retaining ring extending into said recess and being in shear relation with said bull ring.

GEORGE T. JACOCKS.